United States Patent Office 2,772,199
Patented Nov. 27, 1956

2,772,199

COMPOSITION COMPRISING COPPER SALTS OF FLUORINE AND ARSENIC AND FIBROUS MATERIALS CONTAINING SAME

Murray Zakheim, Philadelphia, Pa., assignor to The Pennsylvania Salt Manufacturing Company, Philadelphia, Pa., a corporation of Pennsylvania No Drawing. Application June 29, 1951,
Serial No. 234,477

13 Claims. (Cl. 167—38.5)

This invention relates to pesticide compositions and more particularly to compositions suitable for forming aqueous impregnating solutions for depositing copper salts of fluorine and arsenic in wood and other fibrous materials for protecting the same against attack by harmful organisms including fungi, marine borers, insects and mocroorganisms.

The fluorine and arsenic salts of copper have been found to be particularly suitable for the purpose of preserving wood, these compounds giving excellent protection against wood destroying organisms including termites. Salts such as copper fluoride, copper arsenite and copper arsenate are insoluble in water to any appreciable degree and thus offer greater protection to wood and other fibers impregnated therewith than more soluble compounds where the material treated comes in contact with an excess of water. However, the relative insolubility of these compounds in water, though making their use preferred when once deposited within the fibrous material, makes difficult the preparation of suitable impregnating solutions from which the compounds can be deposited.

Copper salts of fluorine and arsenic have heretofore been deposited in wood and other fibrous materials by first preparing an ammonia solution of these compounds and thereafter impregnating the wood or other fibrous material with the ammonia solution. On drying, ammonia is given off and the copper fluoride, arsenate or arsenite is deposited. The ammonia solution can be prepared either by adding the copper fluoride, copper arsenate or copper arsenite directly to aqueous ammonia or by adding water-soluble or ammonia-soluble salts which will react to form the copper fluoride, arsenate or arsenite. Though copper fluoride, arsenate and arsenite can be deposited in fibers by this process, the process is not entirely satisfactory in that: it is too expensive for practical purposes, the fibers are attacked by the ammoniacal copper solution when relatively concentrated solutions are used, and the ammonia vapors produced by the solution make it necessary for workmen to use gas masks and take special precautions for protection against the liquid.

If the ammoniacal solutions are sufficiently diluted with water, the problems of fiber attack, objectionable vapors and precautions for handling are substantially eliminated; however, on any substantial dilution, the copper salts are precipitated out in large part and the solution, as a result, is rendered unsatisfactory for depositing these salts within the fibrous materials.

In order to permit substantial water dilutions of the copper fluoride, arsenate and arsenite ammonia solutions, it has been suggested to add a hydroxyamine such as triethanolamine, which was found to have a marked stabilizing effect on the copper ammonia compounds permitting their dilution to any desired degree without precipitating the copper salts. When, however, dried samples of cellulose fibers impregnated with triethanolamine stabilized ammoniacal copper fluoride solutions were compared for their stability against leaching with dried samples of cellulose fibers impregnated with an unstabilized ammoniacal copper fluoride solution, the resistance to leaching of the copper fluoride deposits obtained from the stabilized solution was found to be considerably less than the resistance to leaching of the copper fluoride deposits obtained from the unstabilized copper fluoride ammonia solution.

A further disadvantage to solutions stabilized with hydroxyamines is that after dilution on continued standing some of the copper is found to precipitate out of the solution. Since this only occurs after the dilute solution has been left standing for 3 to 4 days, it presents no particular problem where fresh solutions are prepared and used immediately. However, where it is desired to use the same solution over extended periods of time as is frequently the case in the impregnation of wood, solutions stabilized with hydroxyamines such as triethanolamine are, after a few days, unsatisfactory since the copper salts precipitating out of the solution will deposit on the surface of the wood treated and not in the wood or fibers where it gives the best protection.

In my copending application Serial No. 234,478, filed June 29, 1951, I have described a method of stabilizing ammonia solutions of copper salts so as to obtain liquid concentrates of copper fluoride, copper arsenate and copper arsenite which can be diluted with water to any required degree and which are free from the above mentioned objections. However, it is frequently desirable, because of the ease of handling and storing, to work with powder compositions rather than with liquid concentrates. It is, therefore, the primary object of my present invention to prepare solid compositions which can readily be dissolved in water to give impregnating solutions suitable for the treatment of wood and other fibers and which will leave in the wood or other fiber-treated copper salts of fluorine and/or arsenic which have excellent resistance to leaching and give excellent protection against termites and other wood destroying organisms.

Solid compositions containing copper and fluorine which are partially soluble in water and which will deposit copper fluoride from an aqueous solution of the composition on drying are described in U. S. patent to Jones et al., No. 2,406,692 of August 27, 1946. These compositions, however, are objectionable in that they decompose on standing to form insoluble copper fluoride. As a result, it is necessary to add ammonia to the solutions to completely dissolve the compositions thus forming in part an ammoniacal solution similar to those already discussed and having the same objectionable features. Also, dilute solutions cannot be formed from these compositions without adding a substantial amount of ammonia to the solution.

It is, therefore, a further object of my invention to prepare solid compositions suitable for preparing aqueous solutions containing copper salts of fluorine and arsenic which can be stored over extended periods of time without any appreciable decomposition and which can be readily dissolved in water to form substantially clear solutions which can be diluted to any desired degree without the necessity of adding additional materials.

I have now found dry compositions which, after extended periods of storage, will still substantially completely dissolve in water and give in solution copper and one or more of the anions fluoride, arsenate and arsenite in a form such that the solutions can be diluted without precipitation and which on evaporation will deposit substantially insoluble salts of copper and one or more of the above anions.

These compositions are a dry blend of an aqueous ammonia-soluble copper compound, a water-soluble alkali metal base or salt of more basic reaction than an equivalent amount of ammonium hydroxide in aqueous solution, and a water-soluble ammonium salt, other than ammonium carbonate, the blend also containing at least one anion of the group consisting of fluoride, arsenate and arsenite, preferably present in an amount at least the equivalent of the major part of the copper present. The basic compound and ammonium salt are present in amounts that will react to make available in solution at least six equivalents of ammonia for each mol of copper present.

The fluoride, arsenate or arsenite anion may be present as part of the copper compound, the basic compound, the ammonium salt or in the form of a separate compound. As previously stated, the alkali metal base or basic salt, in order to be suitable for use in the compositions of my present invention, should be one whose aqueous solution is more basic than an equivalent amount of ammonium hydroxide. As examples of such salts, one might use lithium carbonate, sodium carbonate, sodium bicarbonate, potassium carbonate, sodium phosphate, potassium phosphate and sodium orthosilicate.

The amount of basic material used and the amount of the ammonium salt used is dependent primarily on the molar equivalents of copper present in the composition and the particular type of ammonium salt employed. Thus, for each mol of copper, in the form of copper fluoride, it is necessary to have released at least six equivalents of ammonia in solution. This could be done, for example, by using any one of the following combinations of alkali metal base or salt and ammonium compound:

| | | | |
|---|---|---|---|
| $CuF_2$ | 1 mol. | $CuF_2$ | 1 mol. |
| $Na_2CO_3$ | 6 mols. | $NaHCO_3$ | 12 mols. |
| $NH_4Cl$ | 6 mols. | $NH_4Cl$ | 6 mols. |
| $CuF_2$ | 1 mol. | $CuF_2$ | 1 mol. |
| $Na_3PO_4$ | 6 mols. | $Na_2CO_3$ | 12 mols. |
| $NH_4NO_3$ | 6 mols. | $NH_4H_2PO_4$ | 6 mols. |

Other mixtures of basic alkali metal bases or salts and ammonium compounds could easily be prepared by any skilled chemist. The above is, therefore, purely for the purpose of illustration and is by no means inclusive of all such combinations. The amounts given are close to the minimum amounts necessary in order to prepare satisfactory compositions. Excess amounts of either the basic material or the ammonium salt apparently have no harmful effects on the solubility of the composition or the stability of the final solution.

In my preferred compositions I use ammonium chloride for the ammonium salt and sodium or potassium carbonate for the base. In preparing my preferred compositions, the ammonium salt is preferably present in amounts of 7 to 9 mols per mol of copper, while the sodium or potassium carbonate is present in amounts of 6 to 7 mols per mol of copper. Also, in the preferred compositions, copper fluoride, copper arsenate or copper arsenite are used as such rather than other copper compounds together with soluble fluorides, arsenates or arsenites.

When cellulose fibers were impregnated with solutions prepared from the compositions of my present invention and the treated fibers dried, the resulting copper deposits within the fibers were found to have a substantially greater resistance to leaching by water than the copper deposit obtained through the use of ammoniacal impregnating solutions prepared by dissolving any of the salts copper fluoride, copper arsenate or copper arsenite in ammonia. This is clearly shown by the examples given in the following table:

| Formula | Mg. of Cu Impregnated | Mg. of Cu After Leaching | Percent Leached | Time of Leaching, hours |
|---|---|---|---|---|
| 2.7 g. $CuF_2.2H_2O$ | 16.8 | 16.8 | 0 | 1½ |
| 8.0 g. $NH_4Cl$ | 16.4 | 16.3 | 0.6 | 4 |
| 14.3 g. $Na_2CO_3$ | | | | |
| 1.6 g. copper ammonium fluoride sol. prepared by addition of $CuF_2$ to concentrated ammonium (16% Cu in solution) in order to prevent pp of Cu on dilution 5.5 g. con. $NH_4OH$ (23% $NH_3$) were then added before further dilution with 92.9 g. water. | 11.6 | 9.2 | 20.7 | 1½ |
| | 13.8 | 9.4 | 31.9 | 4 |

When attempts were made to use ammonium carbonate for the ammonium salt of my compositions, a pasty composition resulted instead of a free-flowing dry mix. Also, the ingredients reacted to form a deep blue salt indicating that copper ammonia complexes were being formed. Furthermore, the resulting composition decomposed on standing to leave in the composition the relatively insoluble copper fluoride, copper arsenate, or copper arsenite depending on the initial ingredients employed. Ammonium carbonate is apparently the only inorganic ammonium salt which acts in this manner. All other ammonia salts tried blended well with the other ingredients of the composition giving a dry free-flowing relatively stable powder which dissolved readily in water to yield substantially stable impregnating solutions.

In using the compositions of my present invention, an aqueous solution containing 1 part composition to 8 to 10 parts water is preferably first prepared. This solution is then diluted with water to whatever concentration is desired. When the dry compositions are immediately added to larger volumes of water, such as 1 part composition to 100 parts water, difficulty is sometimes encountered in completely dissolving the composition. For this reason the two-step method of preparing the final solution is preferred.

The preferred compositions for making copper fluoride impregnants are prepared by using either copper fluoride or a mixture of copper sulfate and sodium fluoride as the copper and fluoride-containing material. This is mixed with ammonium chloride and sodium carbonate in such proportions that for each mol of copper there are present 7 to 9 mols ammonium chloride, and 6 to 7 mols sodium carbonate. Where copper sulfate and sodium fluoride are used, the sodium fluoride is preferably present in amounts such that two mols of sodium fluoride are present for each mol of copper (copper sulfate) though excess amounts of the sodium fluoride apparently have no harmful effects.

In order to better illustrate the practice of my invention, the following examples are given. It is understood, however, that these examples are given by way of illustration only and that the invention is not to be limited to the specific examples employed.

*Example 1*

A dry free-flowing composition was prepared by blending together in a ribbon blender 27 parts by weight $CuF_2.2H_2O$, 80 parts by weight $NH_4Cl$ and 143 parts by weight $Na_2CO_3$. The resulting mixture was then hammer milled to obtain a product of uniform particle size.

When preparing an impregnating solution from this composition an aqueous solution was first prepared containing approximately 1 part composition to 4 parts water. This concentrated solution was then further diluted to the concentration at which it was to be used, the concentration of the impregnating solution depending on the materials treated. Thus, for example, where textiles are to be treated, solutions are used in which the copper content is generally in the range of .5 to 1% whereas for the treatment of wood, copper concentrations of .1 to .02% are generally used.

Example 2

A composition containing 624 parts by weight CuSO$_4$·5H$_2$O 210 parts by weight NaF, 130 parts by weight Na$_2$CO$_3$ and 100 parts by weight NH$_4$Cl was prepared in a manner similar to that of Example 1. An aqueous solution was then prepared containing about 1 part composition to 6 parts water. This was then further diluted to the concentration to be used.

Example 3

A composition containing 138 parts by weight CuF$_2$·2H$_2$O, 545 parts by weight NH$_4$NO$_3$, 740 parts by weight Na$_2$CO$_3$ was prepared in a manner similar to that of Example 1. An aqueous solution was then prepared containing about 1 part composition to 5 parts water. This was then further diluted to the concentration to be used.

Example 4

A composition containing 138 parts by weight CuF$_2$·2H$_2$O, 380 parts by weight NH$_4$Cl and 2400 parts by weight Na$_3$PO$_4$·10H$_2$O was prepared in a manner similar to that of Example 1. An aqueous solution was then prepared containing about 1 part composition to 9 parts water. This was then further diluted to the concentration to be used.

Example 5

A composition containing 240 parts by weight Cu(NO$_3$)$_2$·3H$_2$O, 120 parts by weight KF, 380 parts by weight NH$_4$Cl and 740 parts by weight Na$_2$CO$_3$ was prepared in a manner similar to that of Example 1. An aqueous solution was then prepared containing about 1 part composition to 7 parts water. This was then further diluted to the concentration to be used.

Example 6

A composition containing 540 parts by weight Cu$_3$(AsO$_4$)$_2$·4H$_2$O, 380 parts by weight NH$_4$Cl and 740 parts by weight Na$_2$CO$_3$ was prepared in a manner similar to that of Example 1. An aqueous solution was then prepared containing about 1 part composition to 7 parts water. This was then further diluted to the concentration to be used.

Example 7

A composition containing 185 parts by weight copper arsenite, 380 parts by weight NH$_4$Cl and 740 parts by weight Na$_2$CO$_3$ was prepared in a manner similar to that of Example 1. An aqueous solution was then prepared containing about 1 part composition to 9 parts water. This was then further diluted to the concentration to be used.

In the above examples, the ammonium salts used were ammonium chloride and ammonium nitrate. However, as heretofore pointed out, any ammonium salt other than ammonium carbonate may be used in practicing the invention. Among the salts found suitable are ammonium chloride, ammonium sulfate, ammonium nitrate and ammonium acid phosphate. Also, numerous other salts soluble in water or aqueous ammonium solution can be used in place of the specific copper salts and fluorides, arsenates and arsenites used in the specific examples given. Thus for the soluble copper salts one could use copper fluoride, copper sulfate, copper nitrate, copper chloride, copper chlorate and copper fluosilicate; for the soluble fluorides one could use sodium fluoride, potassium fluoride, and ammonium fluoride; for the soluble arsenates one could use copper arsenate, potassium arsenate, sodium arsenate and ammonium arsenate; and for the soluble arsenites one could use copper arsenite, potassium arsenite, sodium arsenite and ammonium arsenite. The invention, however, is not to be limited to the use of these compounds alone since, as heretofore stated, it is believed that any soluble copper salts can be employed in combination with any soluble fluorides, arsenates or arsenites where the combined salts will form in solution, copper fluoride, copper arsenate or copper arsenite.

Having thus described my invention, I claim:

1. A water-soluble biocidal composition consisting essentially of sodium carbonate, ammonium chloride, and at least one copper salt of the group consisting of copper fluoride, copper arsenate, and copper arsenite and mixtures of soluble salts that will form these copper salts there being present in said composition at least 6 mols sodium carbonate and 6 mols ammonium chloride for each mol of copper salt.

2. The composition of claim 1 in which said material is copper fluoride.

3. The composition of claim 1 in which said material is copper arsenate.

4. The composition of claim 1 in which said material is copper arsenite.

5. A composition for preparing impregnating solutions for the protection of fibrous materials against harmful organisms consisting essentially of copper fluoride, sodium carbonate and ammonium chloride in which is present for each mol of copper fluoride, 6 to 7 mols sodium carbonate and 7 to 9 mols ammonium chloride.

6. A pesticide composition for preparing aqueous impregnating solutions for the protection of fibrous materials against harmful organisms consisting essentially of copper sulfate, sodium fluoride, sodium carbonate and ammonium chloride in which is present for each mol of copper sulfate, at least 2 mols sodium fluoride, 6 to 7 mols sodium carbonate and 7 to 9 mols of ammonium chloride.

7. As a new article of manufacture fungus-proofed wood produced by impregnating wood with an aqueous solution of a composition of claim 9 and thereafter drying the impregnated wood.

8. As a new article of manufacture fungus-proofed cellulose fabrics produced by impregnating cellulose fabrics with an aqueous solution of a composition of claim 9 and thereafter drying the impregnated cellulose fabrics.

9. A pesticide composition suitable for forming aqueous impregnating solutions consisting essentially of a basic inorganic water-soluble alkali metal compound of more basic reaction than a chemically equivalent amount of ammonium hydroxide of the same normality, a water-soluble inorganic ammonium salt of the group consisting of ammonium chloride, ammonium sulfate, ammonium nitrate and ammonium acid phosphate, and at least one copper salt of the group consisting of copper fluoride, copper arsenate, copper arsenite, and mixtures of soluble salts that will form said copper salts, said ammonium salt being present in amounts of at least 6 mols of said ammonium salts for each mol of copper salt of said group and said alkali metal compound being present in an amount of at least 1 mol alkali metal compound for each mol of ammonium salt so as to react with said ammonium salt to release, when in solution, not less than 6 mols ammonia for each mol copper.

10. The composition of claim 9 wherein the copper compound is copper fluoride.

11. The composition of claim 9 wherein the copper compound is copper arsenate.

12. The composition of claim 9 wherein the copper compound is copper arsenite.

13. The composition of claim 9 wherein said water soluble inorganic alkali metal compound is a water soluble alkali metal carbonate.

References Cited in the file of this patent

UNITED STATES PATENTS

| | | |
|---|---|---|
| 1,589,644 | Hedenburg | June 22, 1926 |
| 2,149,284 | Gordon | Mar. 7, 1939 |
| 2,423,619 | Roon | July 8, 1947 |
| 2,547,261 | Geiger | Apr. 3, 1951 |
| 2,573,252 | Farber | Oct. 30, 1951 |

FOREIGN PATENTS

| | | |
|---|---|---|
| 116,419 | Germany | Nov. 28, 1900 |
| 531,512 | France | Oct. 25, 1921 |
| 553,945 | Great Britain | June 11, 1943 |